(12) United States Patent
Nannemann

(10) Patent No.: US 6,470,827 B2
(45) Date of Patent: Oct. 29, 2002

(54) NEST PADS

(76) Inventor: John Nannemann, 1270 Columbia, No. 17, Stamps, AR (US) 71860

(*) Notice: Subject to any disclaimer, the term of this patent is extended or adjusted under 35 U.S.C. 154(b) by 0 days.

(21) Appl. No.: 09/976,593

(22) Filed: Oct. 15, 2001

(65) Prior Publication Data

US 2002/0014210 A1 Feb. 7, 2002

Related U.S. Application Data

(63) Continuation of application No. 09/472,611, filed on Dec. 27, 1999, now abandoned.

(51) Int. Cl.[7] .............................................. A01K 43/00
(52) U.S. Cl. ...................... 119/439; 119/338
(58) Field of Search ................. 119/439, 334, 119/335, 336, 337, 338, 347

(56) References Cited

U.S. PATENT DOCUMENTS

| | | | | |
|---|---|---|---|---|
| 2,606,525 A | * | 8/1952 | Johnson | 119/347 |
| 3,046,940 A | * | 7/1962 | Kurtz | 119/335 |
| 3,118,425 A | * | 1/1964 | Kurtz | 119/335 |
| 3,124,102 A | * | 3/1964 | Kurtz et al. | 119/337 |
| 3,139,065 A | * | 6/1964 | Willauer, Jr. | 119/337 |
| 3,650,246 A | * | 3/1972 | Fowler et al. | 119/337 |
| 4,112,872 A | * | 9/1978 | Van Huis | 119/439 |
| 5,094,186 A | * | 3/1992 | Andersen | 119/337 |
| 5,159,896 A | * | 11/1992 | Mortillo et al. | 119/347 |
| 5,365,878 A | * | 11/1994 | Dyer | 119/347 |

* cited by examiner

Primary Examiner—Yvonne R. Abbott
(74) Attorney, Agent, or Firm—Dennis B. Haase

(57) ABSTRACT

In an egg production facility for producing eggs for hatcheries, having a plurality of nests adjacent a conveyor belt for transporting freshly laid eggs from the nests, a nest pad having a tongue extending outwardly thereof and overlaying the conveyor belt to facilitate movement of fresh eggs from the nest to the conveyor belt.

4 Claims, 2 Drawing Sheets

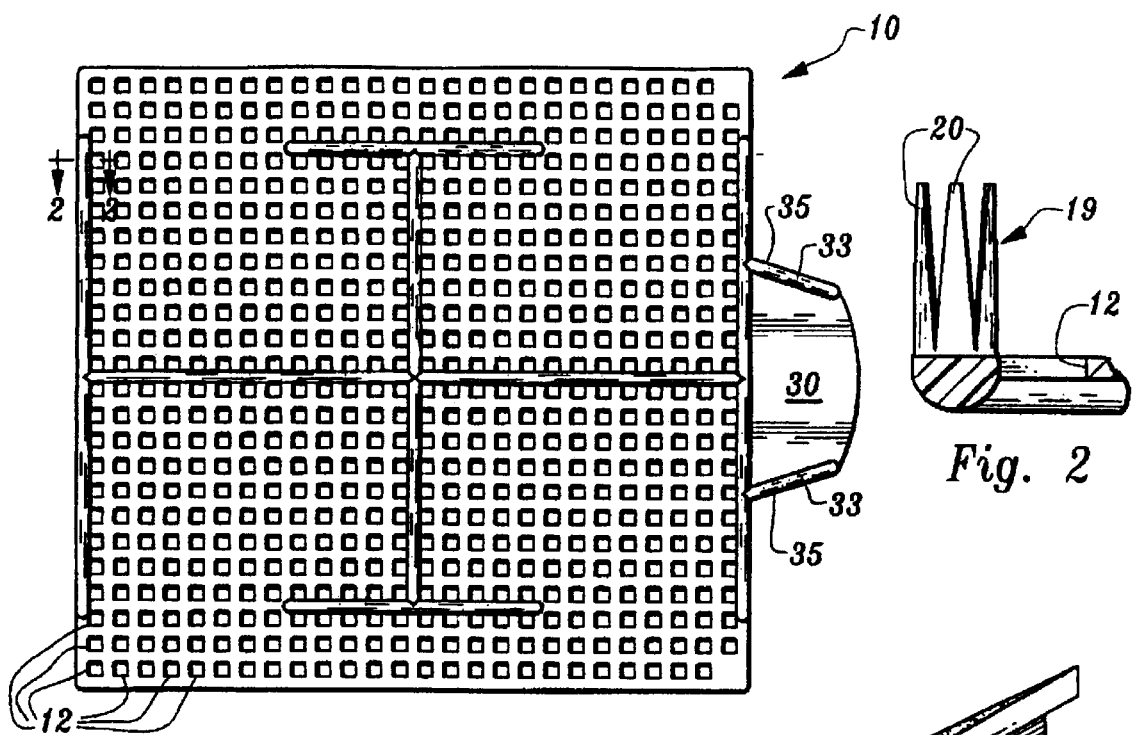
Fig. 1
Fig. 2
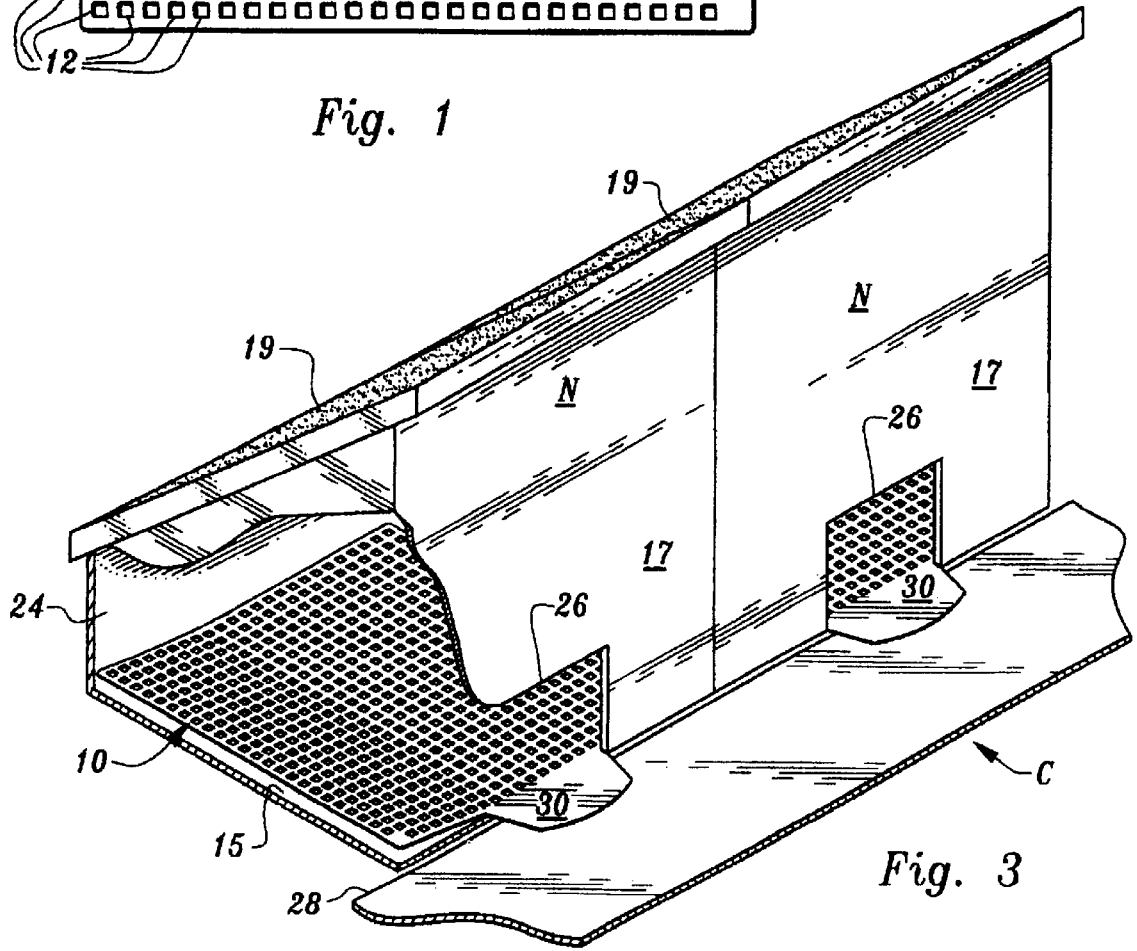
Fig. 3

NEST PADS

This Application is a continuation of my earlier filed application Ser. No. 09/472,611, filed Dec. 27, 1999, now abandoned.

The present invention relates generally to egg producing facilities and, specifically, to such facilities for production of eggs for hatcheries and to improvements in nest pads used to protect eggs from damage during harvest in such facilities.

BACKGROUND OF THE INVENTION

1. Field of the Invention

Egg production has made a quantum leap from the days when mom or grandma went to the hen house and pushed each nesting hen aside and pillaged the nest for eggs, which she deposited in an upraised corner of her apron, or in a basket for later use in feeding the family and/or replenishing the flock.

Modern egg producing facilities, and particularly such facilities which harvest eggs for hatcheries, must have significant capacity to be cost effective and today reflects the assembly line mentality in every aspect of the process, except perhaps for the hen, who takes her own sweet time to do her thing, and there is no way to put her on the clock, as one might with man.

In efficient commercial facilities, laying hens are crowded into large buildings which are replete with a staggering array of nests which flank a conveyer belt used to transport freshly laid eggs to an inspection station. Nourishment and water are ever present and near the nest, and a bevy of roosters inhabit the area in order that the hen need not want for anything.

When the hen lays an egg it rolls down a ramp onto the belt and is thereafter carried by the belt to a station, or stations, as the case may be, where it is carefully washed, because the shell is porous and bacteria must be prevented from passing into the egg; and inspected for cracks, and thereafter packaged with the small end down for delivery to a hatchery. The small end is down in order to preserve a small pocket of oxygen found in a small diaphragm at the upper end. That oxygen is what the hatching chick uses to survive during the hatching process.

2. Overview of the Prior Art

Nest pads are not new in the art as evidenced by the patent art, although such pads are, as will be demonstrated, unsuitable for use in a hatchery facility.

Typical of such pads is the unit manufactured by the Monsanto Company and represented in Mortillo U.S. Pat. No. 5,159,896. Yet another pad of the same general type is found in Dyer U.S. Pat. No. 5,365,878. These pads are representative of the type of pad over which the present invention constitutes a distinct improvement.

Similarly, modern egg producing facilities are represented in such patents as Anderson U.S. Pat. No. 5,094,186, where the bottom of the nest is inclined toward a conveyer. In Anderson, however, the conveyer is beneath the nest and not at the back thereof. Fowler U.S. Pat. No. 3,650,246 is representative of an egg harvesting system in which the eggs fall into individual pockets and are transported for processing.

The Kurtz U.S. Pat. No. 3,118,425 is directed at a shield for protecting an egg from being damaged by a hen, which would have a tendency to peck at the egg after laying it, but further illustrates the conveyer system, together with the discharge opening adjacent there to. The nest pad is a wire mesh, and a mesh guide ushers the egg to the belt.

SUMMARY OF THE INVENTION

Inherent in mechanization are problems which may be exacerbated in facilities such as are being discussed here. The essence of mechanization is efficiency and high production. Yet in a highly mechanized egg producing facility for the hatchery industry, the problems are exaggerated because things happen fast, and they are nonstop. Such problems include broken or cracked eggs which inevitably gum up the conveyor belts, or worse, when all or part of the egg gets under the belt. Additionally, there are a myriad of other bacteria-ridden by products, from manure to feathers, which cause a build up under the edges of the belt.

In consequence of such build up, the belt, which is necessarily soft so as to minimize egg damage, tends to lift at the edges and, in so doing, results in misalignment with the nests, and partially, if not entirely, blocks the free flow of eggs from the nest to the belt, with the eventual stoppage of the conveyor. Since the hens do not stop laying simply because there is a stoppage for maintenance, the problem is exacerbated, and the damage is measurable in real dollars.

With the foregoing by way of environment, it will be appreciated that a principal objective of the present invention is to minimize maintenance delays and coincident costs, including labor incident to delay or stoppage of an egg production conveyor line resulting from an accumulation of fugitive materials underneath the conveyor belt.

Another objective, closely related to the foregoing, is to minimize egg loss as a result of contamination, and disruption of operation of the conveyor in an egg production facility in consequence of the accumulation of fugitive materials beneath the edges of the conveyor. Of course, the corollary objective is to optimize production by minimizing loss to infection or damage to freshly laid eggs between the nest and the conveyor system.

Yet another objective of the present invention is to create a nest pad of such design and construction as to minimize, if not obviate, the problems inherent in the egg delivery system chronicled above so as to accomplish the objectives outlined hereinabove.

The foregoing, as well as other objects and advantages of the present invention, will become apparent from a reading of the detailed specification, taken in conjunction with the accompanying drawings, wherein:

DESCRIPTION OF THE DRAWINGS

FIG. 1 is a top plan view of a nest pad constructed in accordance with the present invention;

FIG. 2 is a partial sectional view of a portion of the nest pad of FIG. 1, shown in side elevation and illustrating certain features of the construction;

FIG. 3 is a perspective view of a typical nest as part of a mechanized egg production facility, viewed from the rear, and illustrating a nest pad constructed in accordance with the present invention in its operative position relative to a conveyer system;

In the following detailed description of the present invention like numbers are used to identify like parts throughout, wherever appropriate.

DETAILED DESCRIPTION OF A PREFERRED EMBODIMENT

Figure 4:
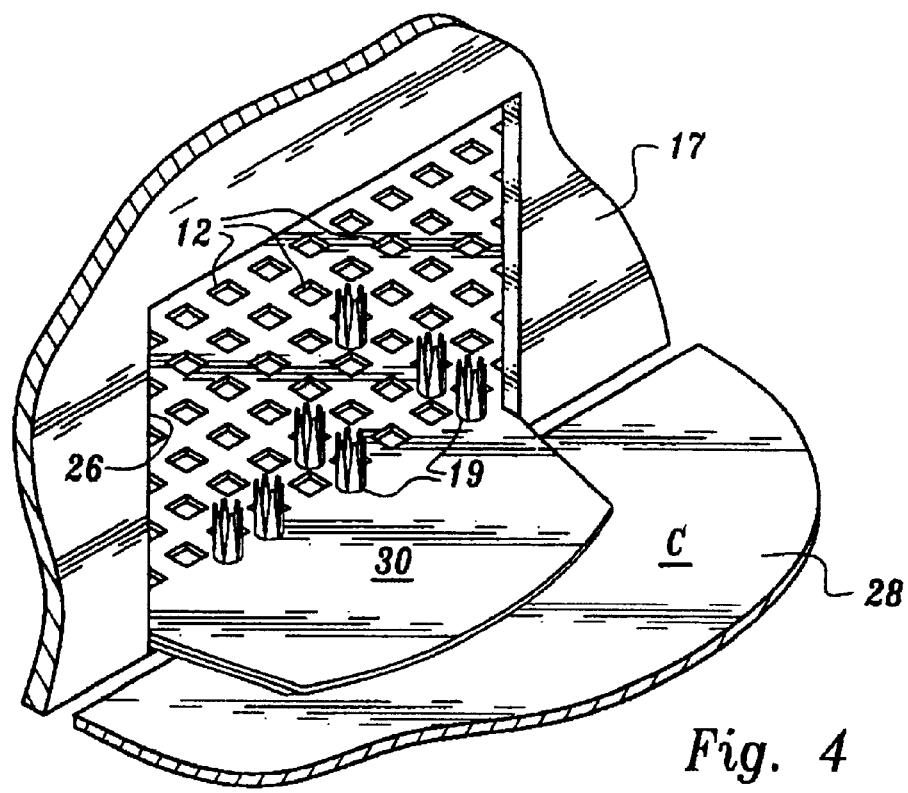
FIG. 4 is an enlarged perspective of a partial sectional view of FIG. 3 illustrating the interrelationship between the nest pad of the present invention and the conveyor belt, the nest pad showing only a selected number of upstanding clusters for purposes of clarity only; and, FIG. 5 is a partial sectional view of the nest of FIG. 3, illustrating the path of a fresh egg from nest to conveyor.

With reference initially to FIG. 1, a nest pad 10, constructed in accordance with the present invention, is shown in top plan view.

The nest pad is essentially rectangular in shape and is dimensionally conforming with the nest in which it reposes. The surface of the nest pad comprises a matrix composed of an array of openings 12, which openings are preferably, but not necessarily, uniform in size and shape. The purpose of the openings is to avoid the accumulation of litter, such as feathers, manure and dirt particles, on the nest pad, thereby making the nesting area as comfortable and contamination free as reasonably possible.

As seen in FIG. 2, the nest pad 10 is formed with a series of upstanding clusters 19 of soft fingers 20. The fingers are pliable and make the nesting area seem comfortable to sit upon while keeping the hen well above any lifter that may be accumulating in the nest. Moreover, the fingers provide some support for freshly laid eggs without damage thereto.

The size of the nest pad 10 is governed by the size of the housing which defines each nest N, in which it is placed, covering the base, or floor, 15 thereof. An array of nests is disposed in an elongate series. Indeed, several series of nests, as illustrated in FIG. 3, are found in a commercial production facility of the type referenced here, where they are typically supported in some well known fashion above the floor.

Each nest N is defined by a back wall 17, which rises from the floor 15, and a cover 19 provides shelter for the nest's occupant between the back wall 17, a side wall 22, and forward or front cover supports 24 which comprise either a front wall, not specifically illustrated, or simple posts as shown.

Whether by use of posts or an upstanding wall with an opening, the frontal area provides ready access to the nest for the laying hen. The rear wall 17 is also provided with an opening 26, which is large enough for the free passage of an egg, but small enough that a hen in the nest can not exit through the opening, or otherwise get caught in it in a fashion which might result in injury to the hen.

Figure 5:
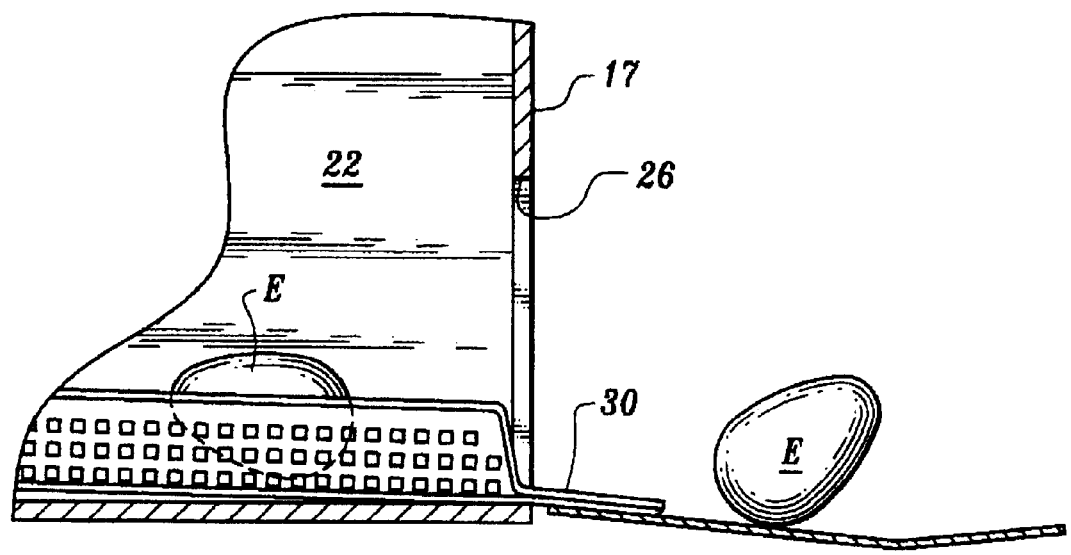

The rear opening 26 flanks a conveyor C, seen best in FIGS. 3, 4 and 5. The conveyor includes a belt, which as may be observed in FIG. 5, is somewhat bowed so as to form a trough for the receipt of freshly laid eggs, and the urging thereof toward the center of the belt, thereby inhibiting loss and breakage of eggs near the edge of the belt. A coincident benefit is that the nest pad protrudes through the opening tending to inhibit the hen from getting a leg through the opening, or pecking at an egg proceeding toward the conveyer, both occurrences being potentially detrimental to the egg.

A significant problem experienced with such conveyors is the strong tendency for litter to accumulate beneath the edges of the belt. Since the belt 28 is very soft so as to protect the eggs from breakage, as litter builds up the edges of the belt tend to lift. As a consequence of the lifting, eggs will hit the edges of the moving belt and be cracked or broken with the albumin from broken eggs coagulating about the litter and broken egg shells, creating a resultant mess which will literally require a shut down of the conveyor to clear the debris and clean up the mess.

Since, however, hens do not stop laying simply because the gathering process has been temporarily halted, the result is utter chaos, indeed pandemonium, in the hen house, with significant loss in production and dollars.

An ancillary problem experienced in this environment, which may be even more vexing to the producer, is that of the eggs which experience hair line cracks in the shell, which cracks are often not visible to the naked eye, yet sufficiently well defined to permit the incursion of bacteria, which is ever present in the hen house environment. There is no sure way to know whether an egg has been contaminated until it explodes, and, of course, by then it is too late. A contaminated egg will explode at about the $18^{th}$ day in the incubator, a hatch taking about 21 days. When, as, and if that egg explodes, it spews bacteria everywhere, and all of the eggs in the incubator are jeopardized, and usually lost, which typically number in the hundreds.

In order to minimize, if not totally obviate the adverse consequences articulated here, and in keeping with the purposes of the invention, a portion of the nest pad protrudes through the opening in the wall to a point in communication with the conveyer. To this end, the nest pad 10 is formed with, or otherwise provided with an extension, or tongue 30, formed of a pliable, soft material, which may include the same material from which the pad itself is formed. The tongue protrudes outwardly beyond the perimeter of the nest pad, is essentially coplanar therewith, and has a smooth surface.

The tongue is so dimensioned as to be capable of passing snugly through the rear opening 26 in the back wall of the nest. Indeed, it may be slightly wider than the opening so as to define a slight trough which would position the egg toward the center thereof. The tongue is, in keeping with the invention, of sufficient length as to overlay a sufficient portion of the moving conveyor belt 28 such that when an egg leaves the nest it will gently roll substantially to the center of the conveyor despite a potential accumulation of litter beneath the belt itself, which may have raised the edge of the belt.

In keeping with another aspect of the invention, by virtue of the pliability of the tongue 30, it is readily deformable. In order to provide necessary perimeter strength therefor, ribs 33 are formed in the tongue, and, as best seen in FIG. 1, they are preferably formed along the lateral edges 35 thereof. Thus, added strength and durability is provided in that only a portion of the tongue will tend to frictionally engage the belt, thereby reducing both drag and wear.

Yet another and further benefit derived from the dimension of the nest pad 10, is the inability of the hen in the nest to twist and skew the pad, which is snugly fitted in the nest, with the tongue 30 similarly fitted in the opening. Thus, the inherent reflex of the hen to scratch at the pad will not upset its position in the nest, nor permit litter and other materials to get beneath it.

It will be apparent from the foregoing that the production of eggs for hatchery use is considerably more precise than production for food, and the measures taken to enhance and protect such egg production far more stringent. In the manner described, the present invention materially enhances production of eggs as well as achieving the several objectives attributable to it.

Having thus described a preferred embodiment, what is claimed is:

1. In a hatchery egg production facility in which a plurality of housings defining laying nests disposed in a serial array and adapted to accommodate a laying hen during the laying process, which housings include a base with upstanding sidewalls about the perimeter thereof, and a cover interconnecting and being supported by at least some of the side walls;

a nest pad, said nest pad having a shape in dimensional conformance with said base of said housing, and reposing thereon; said nest pad being constructed of a soft pliable material to thereby optimize protection for eggs and comfort for the laying hen;

an opening in one of the walls of each of said nests;

a conveyor system, including an endless belt disposed in immediate proximity to said nests and facing said opening; said conveyer system including a belt for receiving eggs from said nests, and transporting eggs away from said nests, a portion of said nest pad extending through the opening adjacent the conveyor system, in overlapping relation with said belt so as to guide eggs safely from said nests to said conveyor belt, said portion of said nest pad extending through said opening comprising a tongue, said tongue having a relatively smooth surface and is tapered inwardly toward said belt.

2. The nest pad of claim 1, wherein said tongue being provided with ribs for strengthening the same.

3. The nest pad of claim 2, wherein said tongue is provided with lateral edges and having ribs provided along lateral edges of said tongue for strengthening the same.

4. The nest pad of claim 1, wherein said tongue is separately formed and affixed to said nest pad.

\* \* \* \* \*